May 16, 1967 J. V. FITZGERALD 3,319,392

FLEXIBLE CERAMIC FILE UNIT

Filed June 18, 1964 5 Sheets-Sheet 1

INVENTOR.
JOHN V. FITZGERALD
BY
MORGAN, FINNEGAN, DURHAM & PINE
ATTORNEYS

INVENTOR.
JOHN V. FITZGERALD

BY

MORGAN, FINNEGAN, DURHAM & PINE
ATTORNEYS

INVENTOR.
JOHN V. FITZGERALD
BY
MORGAN, FINNEGAN, DURHAM & PINE
ATTORNEYS

INVENTOR.
JOHN V. FITZGERALD
BY
MORGAN, FINNEGAN, DURHAM & PINE
ATTORNEYS

FLEXIBLE CERAMIC FILE UNIT

INVENTOR.
JOHN V. FITZGERALD
BY
MORGAN, FINNEGAN, DURHAM & PINE
ATTORNEYS

United States Patent Office 3,319,392

Patented May 16, 1967

3,319,392

FLEXIBLE CERAMIC FILE UNIT

John V. Fitzgerald, Metuchen, N.J., assignor to Tile Council of America, Inc., New York, N.Y., a corporation of New York Filed June 18, 1964, Ser. No. 376,175
10 Claims. (Cl. 52—389)

The present invention relates to prefabricated multiple ceramic tile panels, and similar structural members suitable for use as surface coverings, space dividers, counter-tops, fenestrations, and the like.

The invention is more particularly directed to a prefabricated surfacing unit, or tessella, composed of a plurality of ceramic tile or tessera, linked together by means of a thin, water impermeable, chemically resistant, plastic web to provide a relatively smooth, continuous front surface and a back or rear surface characterized by a network of interconnecting, open channels extending between the lateral edges of the title pieces below the web.

It is difficult and expensive to fabricate large pieces of ceramic tile by conventional methods of manufacture, such as by extrusion or by pressing and then firing in kilns. In order to satisfactorily manufacture large pieces of vitreous tile in accordance with the teachings of the prior art it is necessary that the pieces be made extremely thick so that they will be sufficiently strong for handling and shipping. Such large pieces of tile, however, because of the thickness required, are extremely heavy, and are generally fragile and brittle, and require special anchoring techniques during installation.

Because of the foregoing difficulties, ceramic tile is ordinarily manufactured in relatively small sizes. Thus, the size of ceramic pieces rarely exceeds about 54 square inches (9″ x 6″) and is usually equal to or less than about 17 square inches for glazed wall tile. Ceramic mosaics are usually 1″ x 1″. The thickness of the tile is almost always less than about ¾″ and when the tile is glazed, rarely exceeds ⅜″, and is usually approximately ¼″ for ceramic mosaic type tile.

Because of the small size in which ceramic tile has to be manufactured, one of the most significant costs connected with use thereof is that of installation.

The tile manufacturers in the United States have steadily improved methods of tile preassembly during the decades of the twentieth century. At first tile were individual units which the tile setter handled as such during installation of a wall or floor of ceramic tile. One of the first steps in the direction of preassembly was to mount ceramic mosaic tile on paper attached to their face side with water soluble glue. Later the methods of mounting tile on perforated paper or vinyl sheet permanently bonded to the tile back was employed, and a variation of this method, the use of fibre mesh permanently bonded to the tile backs, followed.

In no case mentioned above did the preassembly save the setter more than the time of individual handling. Setting procedures were the same as before, but faster, and grouting procedures were completely unchanged.

Heretofore, multi-ceramic tile panels have been constructed with various backing materials employed as a support for the panel. For example, glazed wall tile have been glued to gypsum board, plywood, or other backing material and the joint between the tile filled with a Portland cement grout. Panels constructed in accordance with such procedures are not very suitable for installation, in that they are heavy, fragile, and are difficult to cut or trim to size. Moreover, because of the backing, the grout tends to crack and come out from between the edges of the tiles.

Some recent advances in the field of preassembly of individual tiles have attempted to overcome the disadvantages of the backing materials described in the preceding paragraph. In one commercial embodiment, described in U.S. Patent No. 2,852,932, a plurality of tile are mounted in a rubber grid-work having depressions or pockets designed to receive the tile. Another commercial embodiment involves the mounting of tile on a rubber sheet and the hand grouting of such tile with an epoxy grout.

The preassemblies described do not in general permit flexibility in design. Moreover, such preassemblies have non-ceramic material on one of the faces of the preassembled sheet which seriously limits the kind of setting adhesive or mortar which can be used, in particular eliminating the use of Portland cement mortar in the pre-grouted types of panels described above. The first of the described panels requires a soft, flexible grout material between tile because tile must be inserted into the preformed grid, and the bond is between tile and grid, rather than between tile and tile. The soft grout is detrimental to the tile in use. Heavy service cracks and chips the tile because of lack of support from the low strength flexible grout and the soft pad beneath and surrounding the tile. The other method involving hand grouting is not in any way suited to production line manufacture, and the relatively soft cushion under the tile results in cracked tile when the least abuse of the surface occurs.

The panels of the present invention consist of a plurality of ceramic tile bonded solely together at a portion of their edge surfaces by a thin, interlocking web of set-up or grouting cement. Both planar surfaces of the panel are free of grouting or backing material, so that the panels are extremely light. Further, the back or rear surface of the panels are provided with a network of open, interconnecting channels which extends traversely of the panel from the resinous web of bonding cement to the rear surface of the panel. Such panels are capable of withstanding all forces normally encountered in shipping, handling and setting ceramic tile and can be adhered to practically any surface without the necessity of grouting, thereby leading to a tremendous savings in installation costs. Such panels can also be used for fenestration, where the tile are translucent or transparent, or where the tile are provided with apertures, and for decorative space dividers, counter-tops, wall and floor coverings and the like.

A particularly important characteristic of the panels of this invention is that they can be readily cut to any desired shape, including irregular shapes, and, following cutting, do not require hand finishing.

It is an object of this invention to provide a flexible prefabricated, multi-unit ceramic tile mosaic comprising a plurality of ceramic tile pieces joined into a continuous sheet by means of a resinous plastic web so placed as to approximately continue the front ceramic surface and therefore require no grouting after installation.

Another object of this invention is to provide means whereby ceramic tiles may be joined edge to edge with a minimum quantity of expensive grout.

A further object of this invention is to provide ceramic tile sheeting which may be rolled and installed in large continuous sheets.

Still another object of this invention is to provide prefabricated, flexible, multiple ceramic tile panels which can be set in the same manner as the common asphalt tiles and which require very little or none of the tile setter's skill so necessary when ceramic tile are installed in Portland cement mortar beds.

Still another object of this invention is to provide prefabricated tile panels of the type described wherein there is provided adjacent the back surface an open, interconnecting network of channels for reception of adhesive during setting.

Another object is to provide prefabricated, webbed tile mosaics of the type described which have an exposed joint web surrounding the panel and sized to match with panels having similar borders for use in building up a unit capable of covering large areas.

Another object of the invention is to provide prefabricated, webbed tile panels of the type described which can be set with all types of adhesives presently used with ceramic tile, including Portland cement mortars, on all types of substrata conventionally used in the building trades.

Another object is to provide prefabricated, webbed tile mosaics of the type described which are particularly adaptable to be set on curved surfaces.

A further object of the present invention is to provide prefabricated, webbed tile mosaics containing a plurality of regularly or irregularly shaped pieces or bits of tile regularly or irregularly spaced in the masaics, the tile pieces or bits being joined solely at a portion of their edges, by an interlocking, thin web of adhesive material, with no adhesive material on either face of the panel, the tile pieces or bits being unsupported except for the interlocking web.

Other and incidental objects of the invention will become apparent after a reading of the following specification and an inspection of the accompanying drawings wherein.

Figure 6:
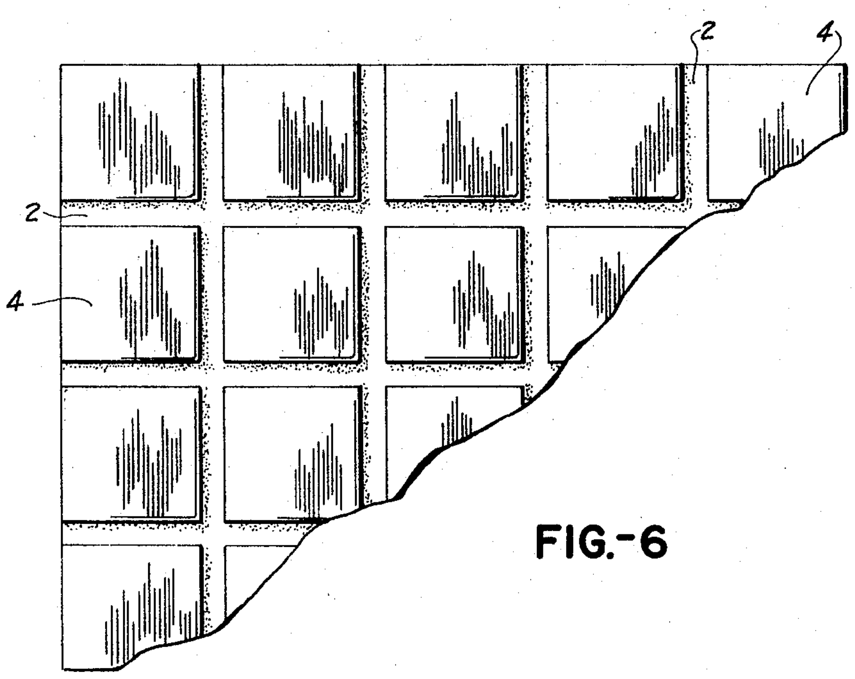
Figure 7:
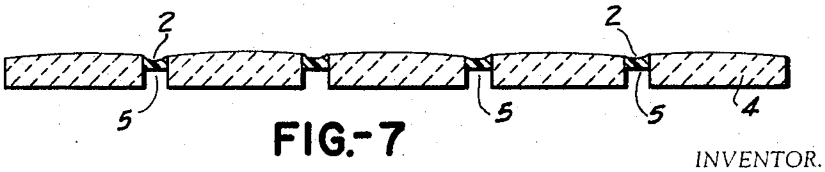
Figure 8:
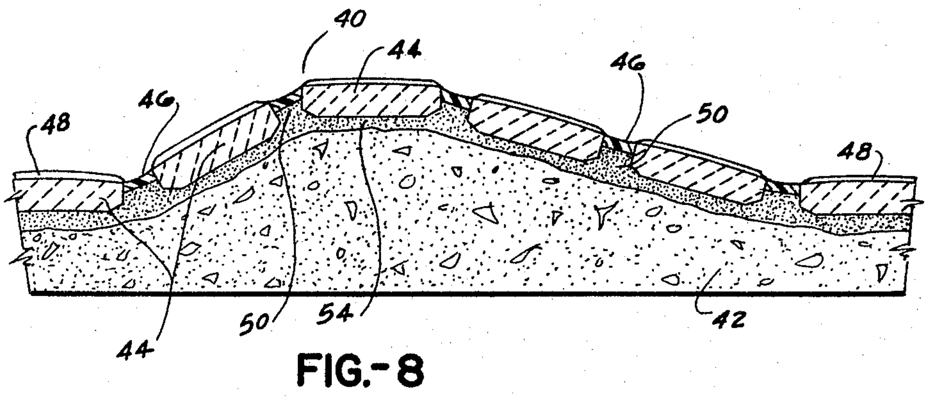
Figure 9:
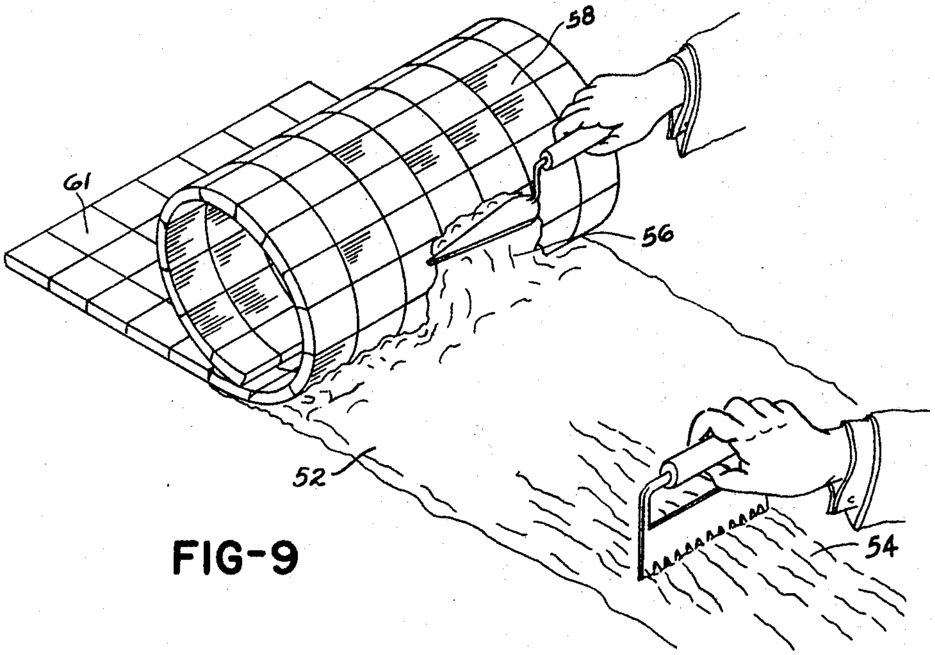
Figure 10B:
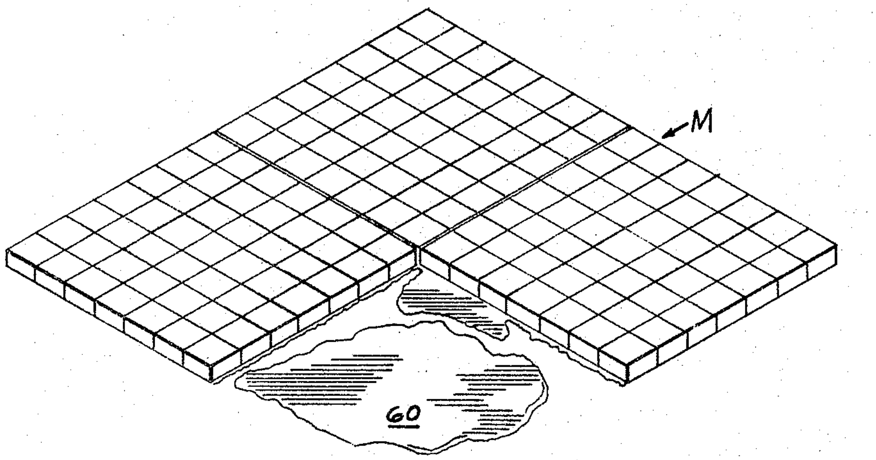
Figure 10A:
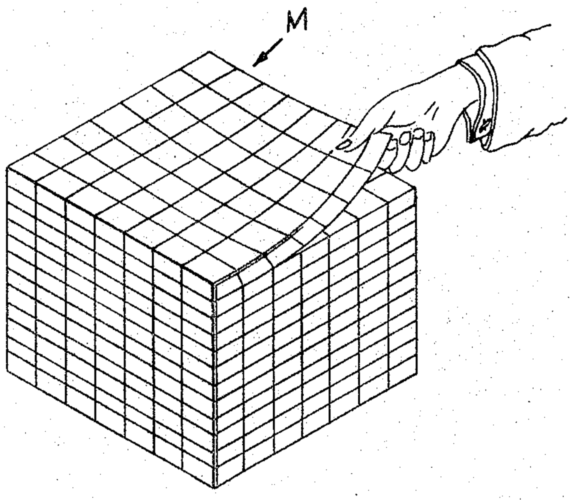
Figure 11:
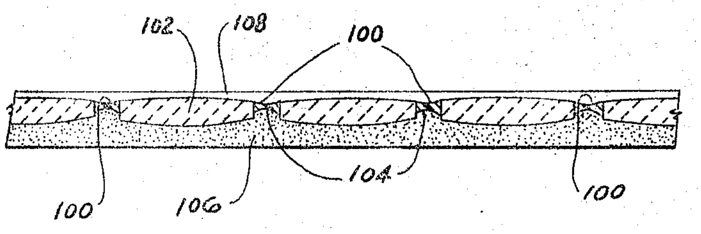

FIGURES 3, 3*a*, 4 and 5 illustrate the manner in which the mosaics of the present invention may be joined together;

FIGURES 6 and 7 are plane and cross-sectional views, respectively, of mosaic panels of the present invention;

FIGURE 8 is a cross-sectional view showing the panels of the present invention set on a substratum;

FIGURE 9 is an isometric view which illustrates the manner in which a preferred embodiment of the invention in the form of a roll may be installed;

FIGURES 10 and 10*a* illustrate still another preferred embodiment of the invention in the form of thin, 1′ x 1′ mosaic sheets and the manner in which this embodiment may be installed;

FIGURE 11 is a schematic illustration of a portion of a mold suitable for fabricating the panels of this invention; and FIGURES 12–16 are cross-sectional views showing various web configurations suitable for use herein.

The mosaics of the present invention are ordinarily assemblies of thin ceramic tiles or tile pieces having a thickness of less than about ⅜″, and generally less than about ¼″, bonded together in edge to edge relationship solely at portions of their edge surfaces by a thin, interlocking web of set-up adhesive material, which is continuous with the front, planar face of the panel and recessed from the rear face of the panel.

The ceramic tile pieces used to make the panels may have a density of between about 1.50 and 2.90 grams/cubic centimeter, and usually have a density of between about 2.30 and 2.50 grams/cubic centimeter. The tile may contain absorbed water ranging from about 0 and 25 percent by weight of the tile.

The web of set-up resinous material exposed at the front surface of the panel will ordinarily constitute less than 25 percent, and usually less than 12 percent of the total planar surface area of the mosaic.

As will be appreciated, the panels of the present invention are extremely light, and compare favorably in weight with such materials as asphalt tile. Like asphalt tile, the panels can be readily cut to any desired shape or size. The mosaics will have various ranges of flexibility, depending mainly upon the thickness of the web.

The web will generally be at least about 0.001″ thick, and will usually range from about 0.01″ to approximately one-half the thickness of the tile.

The flexible panels described herein are suitable for covering curved surfaces, for wrapping around columns and the like, and for storage and installation in the form of rolls. The mosaic sheets constituting such rolls will typically have a radius of curvature less than 4 inches and even as low as 2 inches.

This invention satisfies a long felt need in the art to make ceramic tile competitive with synthetic resin surfacing materials.

So far as initial material cost is concerned, ceramic is by far the least expensive quality surfacing material on the market today. Additionally, ceramic is harder, more chemically inert, and more wear resistant than any other practical surfacing material presently available. These facts highlight the commercial promise for ceramic as compared with other conventional surfacing materials, such as linoleum, synthetic plastic tiles, and even rugs.

Ceramic as a surfacing material, e.g., flooring, has heretofore not achieved its commercial promise, however, because special installation requirements such as grouting, require experienced tile setters who are skilled artisans and therefore costly. Thus, ceramic in its ordinary available installed form is not competitive with conventional surfacing material of the type described, and is therefore relegated by most architects to special areas, such as bathrooms, shower stalls, and the like, where its special properties outweigh installed cost differentials.

The web bonded tile assemblies of this invention can be furnished and installed at costs considerably below anything heretofore experienced in the tile art. These web tiles completely eliminate the costly grouting operation, as well as the costs involved in individual handling of many small pieces.

Further, in the web tile mosaics of this invention the materail cost for grout is considerably reduced as compared to the tile assemblies of the prior art, prefabricated or conventional, in which the joints between the tile pieces are completely filled with grout.

In a typical ceramic mosaic tile assembly, the exposed grout constitutes only about 12 percent of the exposed surface. The amount of bonding material in filled joints between tiles in such installations, however, is relatively expensive, especially when the grout is a synethic resin, such as epoxy resin. Thus, although the exposed grout may amount to only about 12 percent of the surface area of a tile installation, it contributes significantly to the material cost of the assembly.

Prior attempts to reduce the material cost of grout included closer spacing of the ceramic pieces and addition of cheap fillers to the grouting resins. Closer spacing proved unsatisfactory because it reduced flexibility too much. Cheap fillers, although tolerable to a degree, if added in excess degrade the physical properties of the resin and render the entire assembly unsatisfactory.

Surprisingly, when the resin is formed into a thin front face surface webbing between the tile joints as described herein, a significant reduction in the material cost of grouting is achieved, with no loss of physical properties and with unexpected improvement in flexibility.

Web tile panels having various configurations are depicted schematically in the drawings.

Figure 1:
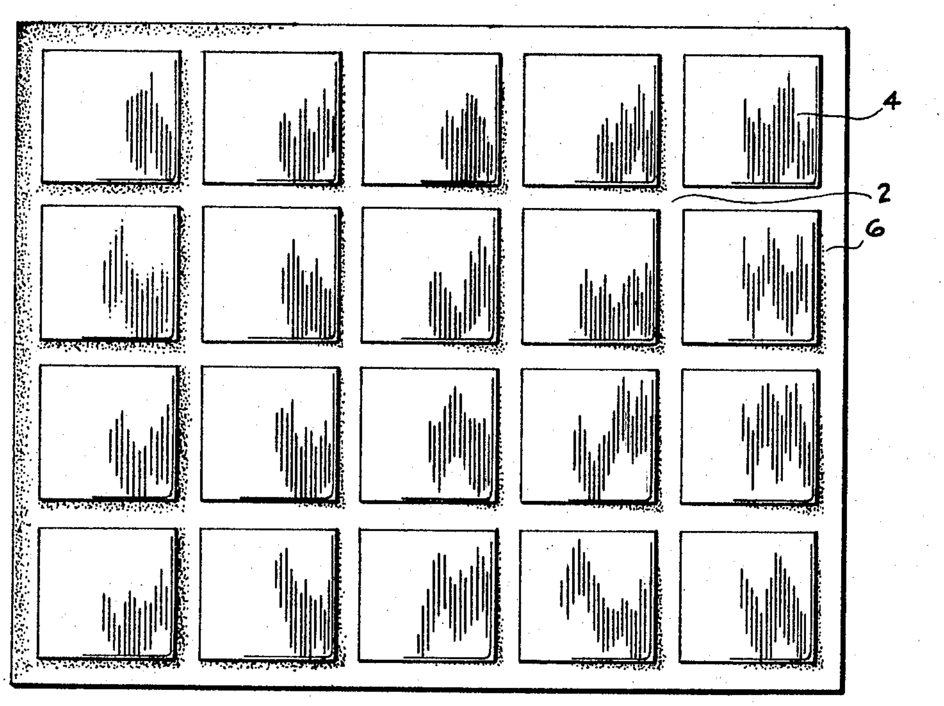
FIGURE 1 is a plane view of one form of a multi-ceramic tile mosaic of the present invention.
Figure 2:
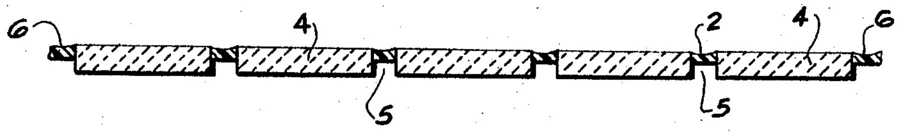
FIGURE 2 is a cross-section of the multi-ceramic tile mosaic of FIGURE 1.

In FIGURE 1, which is a plane view, the panel shown contains a plurailty of rectangularly shaped tiles 4 uniformly arranged. The thin, interlocking web of grout 2 forms a bridge between adjacent pieces and bonds the upper portion of the edge surfaces of the tile pieces together as shown in FIGURE 2. Behind the thin web, as seen in FIGURE 2, there extends a network of interconnecting open channels 5. An exposed web joint 6 also completely circumscribes the plurality of tiles, as shown in both FIGURES 1 and 2. This exposed web border permits grinding of the panel to uniform, accurate dimensions, thus permitting sizing so that the panel can be matched with other panels of the same kind to form a complete surface as is illustrated by FIGURES 3, 3*a*, 4 and 5. It will also be apparent that the panels can be readily cut to fit areas of any desired size or shape.

As shown in FIGURE 2, the exposed surface of the resin web 2 is in the same plane as that of the tile pieces 4. The resinous web 2 however is slightly recessed or concave, thereby allowing the more durable ceramic tile to be subjected to most of the wear as also shown in FIGURE 2.

In FIGURES 3, 3*a*, 4 and 5, various cross-sectional configurations for the exposed web border are shown.

Figure 3:
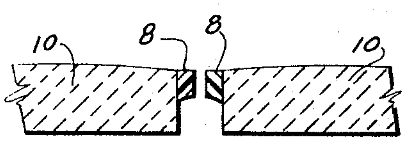
Figure 3A:
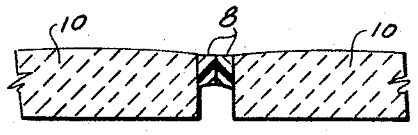

In FIGURE 3, the exposed web borders 8 of two separate panels 10 are shown to have a vertical or slightly bevelled free edge. In assembling, the free edges are simply butted together as shown in FIGURE 3*a*.

Figure 4:
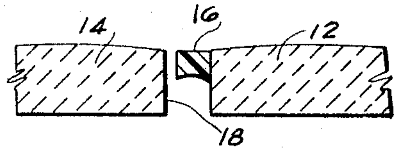
Figure 5:
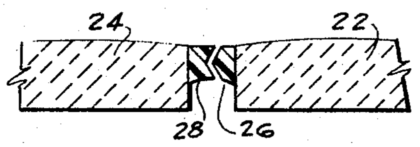

In FIGURE 4, there is shown an assembly wherein one of the panels 12 is provided with an exposed web border 16, and another panel 14 is free of a web border or trim. These two panels may be assembled by simply butting the web border 16 of panel 12 against the ceramic edge surface 18 of panel 14. In FIGURE 5, there are shown panels 22 and 24, each provided with exposed web borders 26 and 28, respectively. In assembling the panels, the male web 26 simply meshes with the female web 28.

In the embodiments of the invention which possess an exposed grout border serving as a finishing edge, it should be understood that the thickness of the border need not be the same as the thickness of the web. Indeed, the grout border may have any thickness, e.g., it may be as thick as the tile pieces making up the panel, or even thicker. Further, the grout border may have any geometrical configuration which may be suitable for mating with or butting against another panel having a grout border with a complementary configuration.

Also, it is not necessary that the panel have an exposed grout border.

In FIGURES 6 and 7, for example, are shown embodiments of the web tile panels which do not contain an exposed grout border around the periphery.

As mentioned previously, an important feature of the panels of this invention resides in the fact that the rear surfaces are bonded with an interconnecting network of open channels (see FIGURE 2 at 5) for reception of a wide variety of setting mortars or adhesives.

The open, interconnecting channels at the back surface of the panels of this invention permit the panels to be firmly bonded to a wide variety of substrata using a wide variety of adhesives, including conventional hydraulic cement mortars, as well as organic adhesives. The open channels at the back surface of the web tile panels serve as crevices or recesses for reception of the bonding adhesive. The bonding adhesive penetrates this interconnecting network of channels and it is this phenomenon that accounts for bonds of increased strength when the panels described herein are set in a mortar bed on a substratum.

In FIGURE 8 is shown an embodiment of the invention wherein a web tile panel shown generally at 40 is adhered to a suitable substratum 42, such as concrete, wood, and the like.

The ceramic tiles 44 with bright fired on ceramic glaze 48 shown in FIGURE 8 are of the cushion edge type. The resinous web 46 is extremely thin, thereby achieving great savings in material cost. Also, the web 46 is recessed from the wearing plane 48 of the tile since the surface of the interlocking web 46 continues the actual contour of the ceramic cushion edges, as shown.

As shown in FIGURE 8, the interconnecting network of channels at the back of the panel is filled with the same mortar or adhesive 54 as is used to bond the tile to the irregular substratum 42. When the mortar 54 hardens, it firmly supports the resinous webbing 46 and also bonds the tile to the substratum. It will be appreciated that in the construction shown in FIGURE 8, the high wear resistant properties of the tile as well as the good chemical and structural properties of the resin constituting the webbing 46 are fully utilized.

Heretofore ceramic tile have been assembled into large flexible sheets or rolls by face mounting on water removable temporary paper, by adhering to a fish net-like backing or by rubber dot bonding at the lower corners. Surprisingly, it has been discovered that comparable flexibility even with relatively stiff bonding material is achieved when the web-bonding technique of this invention is employed.

Thus, according to this invention there is provided web-bonded sheets of ceramic tile in the form of rolls, as shown in FIGURE 9. Such rolls resemble rolls of linoleum or carpeting, and may be installed in much the same way as these two well known, conventional, surface covering products.

As shown in FIGURE 9, in installing a sheet of web tile which is initially in the form of a roll 61, an adhesive or mortar 52 may be screeded, trowelled or combed as shown at 54 over the base floor and/or adhesive or mortar 56 may be buttered over the back face of the tile and into the interconnecting network of open channels 58 in the rear face of the sheet for support of the webbing when wearing exposure so requires.

The rolled sheets described herein constituting a flexible, continuous ceramic sheet capable of being installed without grouting represents a new and novel approach to the art of ceramic tile installation.

The paper mounted, fiber meshed backed and dot tile assemblies heretofore suggested by this art all require grouting as an additional operation during installation. Such prior art assemblies are obviously not the same as the web tile panels of this invention.

The web bonded ceramic tile sheets described herein may be utilized advantageously on wainscots and especially to form continuous water impervious ceramic surfacing in showers and tub recesses. Thus, there is no intent to limit the application of such panels to flooring. Rather, ceilings, exteriors and even furniture, including kitchen counters and the like, constitute suitable sites for application of the products of this invention.

Setting of continuous sheets of web bonded tile panels to gypsum wallboard makes the latter acceptable for use in wet areas since water cannot directly penetrate. A novel application consists of a one-wall piece lining in a circular shower. In this application, a web bonded ceramic panel is delivered to the unfinished shower. To install, the wall is coated with adhesive and the roll of tile stood on end and unrolled in place against the adhesive.

In an alternative embodiment of the invention, the joints between the tile are filled in one direction of the panel, but web bonded in a direction perpendicular to the direction in which the filled joints run. This embodiment permits the fabrication of large sheets which may be rolled in one direction only.

Still another form of this invention as shown in FIGURE 10*a* is the stack *m* of 1′ x 1′ x ¼″ prefabricated tile panels composed of 9⁄16″ x 9⁄16″ x ¼″ ceramic tessera bonded together by means of a surface lattice of resinous webbing. These panels may be readily set in a mortar bed 60 as shown in FIGURE 10*b*, and in this manner employed to good advantage as a wall or floor or even ceiling covering.

In the prior art, assemblies have been suggested wherein 9⁄16″ x 9⁄16″ ceramic tiles are inserted and glued into a premolded 9″ x 9″ perforated rubber waffle. Such assemblies, although commercially available and widely used, do not withstand heavy rolling traffic as do the web joined tile of this invention. Further, in such assemblies, substantial quantities of rubber are required to form the waffle which fills the joints and covers substantially the entire back of the tile pieces, only a small area of the back surface of the tile being left exposed. As compared to the prior art product described, the pre-assemblies of the present invention require an extremely small amount of resin to form the web. Also, with pre-assemblies of the type under discussion, an additional glue and a gluing step is required to hold the inverted tile to the rubber waffle.

In another form of tile pre-assembly suggested by the prior art, the tile pieces are simply precoated with adhesive and molded into a polyvinyl type grout and backing. In this product the amount of polyvinyl resin required is relatively large and its presence over the entire backing limits the setting mortar which can be used to certain special organic adhesives.

The web bonded panels of this invention, such as are shown at *m* in FIGURES 10*a* and 10*b*, as distinguished from such prior art assemblies, can be set in all types of organic and inorganic adhesives, including hydraulic cement. The web tile panels, because of the open network of interconnecting channels at the rear surface and the impervious resin webbing contiguous with the front surface, provide better performance than do the prior art assemblies, and at considerably less cost.

FIGURE 11 illustrates means by which the web tile panels of this invention may be made. As shown in FIGURE 11, the webbing resin may be injected into the joints 100 between tile 102 and channels 104 formed by a specially molded back surface release cushion 106 and front surface release cushion 108. Apparatus suitable for carrying out the injection molding step is disclosed in copending patent application Ser. No. 158,707, now abandoned.

FIGURES 12–16 illustrate a series of cross-section configurations for the web which are readily obtainable with apparatus of the type described and which have been found satisfactory in use. The web configurations shown at A and B in FIGURES 12 and 13, respectively, are especially suitable for square edge ceramic tile 80.

Figure 14:
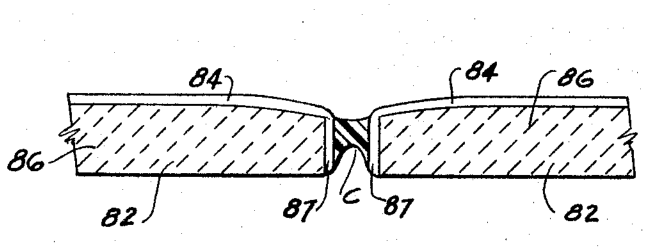

The web configuration C of FIGURE 14 is readily adaptable for use with glazed wall tile 82. In FIGURE 14, 84 represents the ceramic glaze and 86 the bisque or absorptive body of the tile. At 87 in FIGURE 14 are shown spacers or lugs which do not contact each other in this instance.

Figure 15:
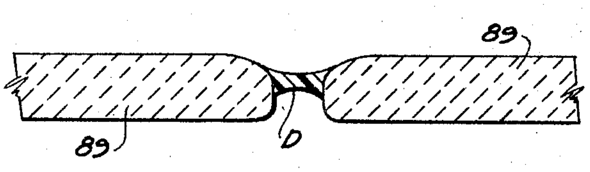
Figure 16:
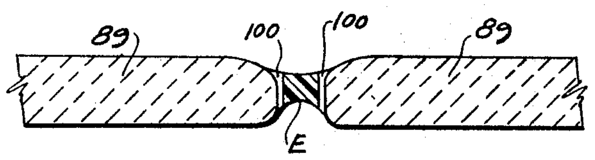

Webs D and E shown in FIGURES 15 and 16 are typical configurations which may be used with cushion edge tile 89. The very thin webbing shown at D, FIGURE 15, is no more difficult to manufacture than the thick webbing shown in E, FIGURE 16, but is much less costly and renders the product more flexible.

It will be clear that in the embodiments described the web connection between the tile pieces is slightly depressed below the ceramic tile wearing surface and greatly depressed below the rear or bonding face of the tile. The first feature enhances overall wear resistance. The second feature enhances flexibility and economy.

Figure 12:
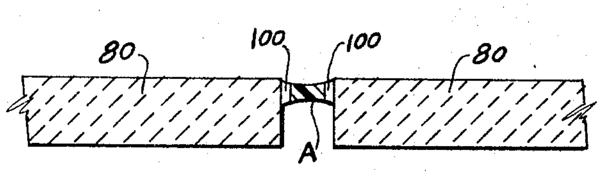
Figure 13:
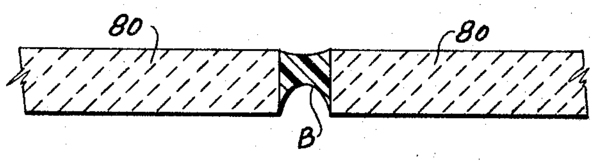

In the embodiment shown in FIGURES 12 and 16, the edge surfaces of the tile pieces are precoated with a primer 100 to which the web in turn is directly adhered. When primers are used in this manner, polyvinyl resins are especially suitable for use as the web material.

Web bonded tile, when installed in cheap organic adhesives, give the excellent stain resistant performance of epoxy grouted tile but without requiring the expensive, on the job, epoxy grouting operation.

It will be clear from the foregoing that the tiles used to make the web tile mosaics may be unglazed, glazed on one surface only, or glazed on two surfaces.

Suitable types of resinous material for the web include epoxy resins, polyester resins, vinyl resins, such as polyvinyl chloride and polyvinylidene chloride, rubber, both natural and artificial, polyurethane resins, and the like.

With organic resins of the type described, suitable curing agents, accelerators, extenders, plasticizers, etc., which are conventional, will be employed.

If desired, the resin used to form the web may contain pigments and coloring agents to produce webs of a specified color and shade. Aggregates, such as silica, silica gel, sand, and so forth may also be used to improve bond strength in a manner now well understood in the art.

The resin may also include chopped fibers for reinforcement and strengthening.

In the event that an anti-static installation is desired, small amounts of a conductor may be added to the web formulation. Thus, for example, carbon black and small amounts of metal, such as copper and the like, may be added to the resin. Alternatively, when anti-static panels are desired, the mosaics may be fabricated using so-called conductive tile. Such tile is ordinarily made from clays containing a small portion of conducting materials, such as iron or iron ores.

The resinous epoxides constitute a preferred embodiment of the web forming material and comprise those compounds having the reactive epoxy resin group

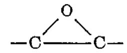

The polyepoxides may be saturated or unsaturated, aliphatic, cycloaliphatic, or heterocyclic and may be substituted if desired with substituents such as chlorine atoms, hydroxyl groups, ether radicals and the like. They may also be monomeric or polymeric.

Examples of the polyepoxides include, among others, epoxidized glycerol dioleate, 1,4-bis(2,3,epoxypropoxy) benzene, 1,3-bis(2,3-epoxypropoxy) benzene, 4,4′-bis(2,3-epoxypropoxy) diphenyl ether, 1,8-bis(2,3-epoxypropoxy)-octane, 1,4-bis(2,3-epoxypropoxy)-cyclohexane, 4,4′-bis(2-hydroxy-3,4′-epoxybutoxy)-diphenyldimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy) benzene, 1,4-bis and (2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in the presence of an alkaline medium. Polyhydric phenols that can be used for this purpose include, among others, resorcinol, catetchol, hydroquinone, methyl resorcinol, or polynuclear phenols, such as 2,2-bis(4-hydroxyphenyl) propane (bis-phenol A), 2,2-bis(4-hydroxyphenyl) butane, 4,4′-dihydroxybenzophenone, bis-(b-hydroxy-phenyl) ethane, 2,2′-bis(4-hydroxyphenyl) pentane, and 1,5-dihydroxynaphthalene. The halogen-containing epoxides may be further exemplified by 3-chloro-1, 2-epoxybutane, 3-bromo-1, 2-epoxyhexane, 3-chloro-1, 2-epoxyoctane, and the like.

The monomer products produced by this method from dihydric phenols and epichlorohydrin may be represented by the general formula:

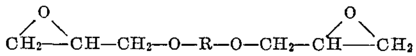

wherein R represents a divalent hydrocarbon radical of the dihydric phenol. The polymeric products will generally not be a single simple molecule but will be a complex mixture of glycidyl polyethers of the general formula:

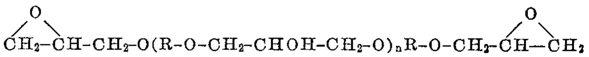

wherein R is a divalent hydrocarbon radical of the dihydric phenol and *n* is an integer of the series 0, 1, 2, 3 and so forth. While for any single molecule of the polyether *n* is an integer, the fact that the obtained polyether is a mixture of compounds causes the determined value for *n* to be an average which is not to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxide resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins," "Gen Epoxy," "DER Resins," "ERL Resins," "Epi-Rez"; the peracetic-acid-epoxidized compounds sold under the trademark "Unox Diepoxides"; and the trifunctional epoxy compounds sold under the trademark "Epiphen." An example of the trifunctional type of compounds is "Epiphen" ER–823, which has the following formula:

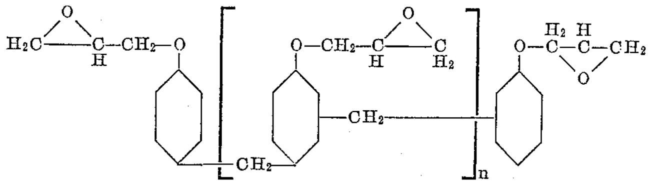

where $n$ is a number such that from about 180 to 200 grams of the resin contain about one gram mole of epoxide group.

Typical of the curing or cross-linking agents for epoxy resins may be mentioned the amine curing agents, i.e., amines containing at least 1 and preferably at least 2 amino nitrogen atoms, e.g., polyamines. Such materials include ethylene amine, ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines, such as alkyl polyamines in which the alkyl group is butyl, hexyl, octyl, and so forth.

Also suitable are aromatic amines such as metaphenylene diamine and methylene dianiline.

The polyester resins suitable for use to form the webs may be defined as polycondensation products of polycarboxylic acids and alcohols. Particularly suitable are the unsaturated polyester resins produced by reacting a polyhydric alcohol and a polycarboxylic acid, either or both of which contain a double bonded or otherwise unsaturated pair of carbon atoms. The double bonds in the unsaturated polyester resin thus formed render the polymers capable of subsequent cross-linking. Of the polyhydric alcohols, the glycols of ethylene, propylene, 1,3- and 2,3-butylene, diethylene and dipropylene, each with its own special characteristics, are preferred. The unstaturated polymeric acid may be maleic anhydride, or fumaric acid. Saturated dibasic acid components, such as isophthalic, adipic and azealic acids, and phthalic anhydride, may also be used in forming the polyesters, again with many variations. Linear dibasic acids, for example, adipic acid, may be used to increase flexibility. Also may be mentioned bis-phenol A polyester resins, such as styrene solutions of the reaction product of propylene oxide, bis-phenol A and fumaric acid.

If desired monomers containing double bond unsaturation can be added to the linear unsaturated polyester to achieve a three-dimensional structure when cured. Among such monomers may be mentioned styrene, dialkyl phthalate, vinyl toluene, methyl methacrylate, or trialkyl cyanate.

Cure of the polyester resin is initiated by the addition of a catalyst, usually an organic peroxide or hydroperoxide, such as methyl ethyl ketone ("M.E.K.") peroxide, and the like, and activators or accelerators, such as cobalt napthenate, alkyl mercaptans, and dialkyl aromatic amines are used to promote the cross-linking reaction so that he cure can be effected at room temperature or short time at higher temperatures.

Typical of the polyester resins are the commercial products sold under the trade names Vibrin 117, Vibrin 121, Vibrin 135 and Vibrin 136A. Such resins are cured by addition of organic peroxide, such as methyl ethyl ketone peroxide. Activators such as cobalt napthenate, alkyl mercaptans, and dialkyl aromatic amines are used to speed up the cross-linking reaction of these resins.

Among the resins suitable for use may also be mentioned the polyurethane resins, which are prepared by the reaction of saturated or unsaturated polyesters of the type described with diisocyanate compounds, such as 2,4-toluene diisocyanate. Also suitable are polyurethane resins prepared from polyethers and castor oils. Such resins are well understood in this art.

The polyvinyl chloride resins suitable for use in making the web may be prepared by addition polymerization of vinyl chloride monomer, in the presence of a catalyst, usually an organic peroxide. Also may be mentioned copolymers of vinyl chloride with vinyl esters, such as vinyl acetate and vinyl maleate, and with vinylidene chloride. Such resins may be modified by the addition of plasticizers, such as di-2-ethyl hexyl phthalate, heat stabilizers, pigments and fillers to obtain a variety of physical characteristics, as is well understood in the art.

Particularly suitable for use are the polyvinyl chloride resins sold under the trade names Maurinol Vr50, Pliovic Wo, Pliovic OA, and Pliovic OA–Z. Among suitable plasticizers and extenders may be mentioned Paraplex G–62 and Dispersal.

It should be understood that the resinous materials described are merely illustrative of a wide variety of such materials which may be used in forming the web.

The following examples will serve to illustrate the manner in which the teachings contained herein may be carried out.

*Example 1*

Fifty weight parts of a low viscosity liquid, aliphatic polyepoxide having an equivalent weight of 390–470 and a viscosity of 4–9 poises at 25° C., which was purchased under the trade name "Epon 871," was mixed with 50 weight parts of a semi-solid epoxy resin, especially designed to impart flexibility, which had an epoxide equivalent of 650–750, and was purchased under the trade name "Epon 872." The resulting resin admixture was combined with 40 weight parts of Z-amino ethyl oxybisbenzyl amine which served as a curing agent for the epoxy resins.

8″ x 8″ arrays weighing 449 grams and consisting of 64 $^{15}/_{16}$″ x $^{15}/_{16}$″ x ¼″ ceramic tile adhered to a pressure-sensitive masking paper were placed in metal trays with the paper surface down so that the open joints of the tile arrays were exposed. Using a caulking gun with a fine nozzle, the described epoxy resin adhesive composition was injected between the tile pieces to partially fill the open joints, thus obtaining a web bonding material which adhered to the edges of the tile and formed a finished grout surface while requiring only a fraction of the expensive epoxy material normally required to fill the joints when grouting is either accomplished after setting or when the joints are completely filled.

The resulting tile assembly were cured in an oven at 90° C. In this way, 8" x 8" web-bonded tile panels containing about 18 grams of resin each were made. The web thickness was 0.1 inch and the panels had the general configuration shown in FIGURES 6 and 7.

When the joint was filled to 0.22", i.e., approximately fully grouted, the array contained 39.2 grams of resin between the tile joints. Thus, the web tile panels contained less than 50 percent resin in the tile joints, as compared to the fully grouted panels.

Radius of bend was measured around a spiral form. The spiral form was clamped to one end of a web tile panel (web tile in a horizontal position, front face side up) and rolled along causing the web tile to roll up on its slowly diminishing radius. The point, or radius, at which the web cracked was recorded. Using this procedure, it was determined that the web tile could be wrapped around a 2.75" radius without cracking the web or losing bond.

*Example 2*

One hundred weight parts of the resin combination of Example 1 were mixed with 100 weight parts of a flexibilizing liquid epoxy resin derived from the intermediate Bisphenol R purchased under the trade name "Epoxy Resin R." The "Epoxy Resin R" had an equivalent weight of 315 and a viscosity of 3.5 poise at 25° C. Next, 37 parts of amino methyl stearyl amine was added. The resulting adhesive composition was used to make a web tile panel using the tile arrays and the procedure described in Example 1. The title panels following cure by heating to 90° C. had the general configuration of FIGURES 6–7. The web of the panel was 0.12" thick and weighed about 20 grams. Thus the joints between the tile pieces making up the panel were about 50 percent filled.

Flexibility was measured as the deflection caused by loading a span of web tile two tiles wide by seven tiles long. Deflection was measured across two beams supported 6" on center with increasing loads being applied at the center. Each load was allowed to bear on the sample for 30 seconds before recording deflection. Two hundred and twenty-seven grams deflected the tile beam by 0.25". 377 grams deflected it 0.9".

*Example 3*

Sixty weight parts of a flexible epoxy resin having an equivalent weight of approximately 398 and a viscosity of 3.5 poises at 25° C. which was purchased under the trade name of Araldite DP–437 was mixed with 40 weight parts of a conventional epoxy resin derived from Bisphenol A having an epoxide equivalent weight of 180–190 and a viscosity of 160 poises at 25° C. which was purchased under the trade name Epon 828.

To this resin combination was added 35 weight parts of a polyamido amine having an equivalent weight of 138–140 and a viscosity of 3–5 poises. The polyamido amine was purchased under the trade name EM–308. Using the resulting adhesive composition, web tile panels were made utilizing the tile arrays and the procedure described in Example 1.

After partially filling the joints between the tiles to 0.105" as in example 1, the resin was cured by heating to 90° C. The web tile so formed was so rollable it could easily be wrapped around a 2.75" radius. It was also quite flexible, deflecting 0.3" when loaded by 1000 grams in accordance with the procedure in Example 2.

Four web tile panels made in accordance with this example were installed on a vertical surface; two with a dry-set Portland cement composition of the type described in United States Patent No. 2,934,932, and two with CTA–11, a commercially available organic mastic used by the tile trade to set tile. One panel in each set was buttered to fill the open network of interconnecting channels behind the web. All four of the panels were set in a bed of the described bonding material which had been spread with a 3/16" deep triangular notched trowel. One week later each of the panels was noted to be well bonded, a hammer and chisel being required to pry the tile loose.

*Example 4*

The resin composition of Example 3 was mixed with 15 weight parts of an aliphatic amine curing agent purchased under the trade name Epicure 87 to form an adhesive bonding composition. Using the procedure of Example 1, the adhesive was injected between the joints of a spaced array of 1" ceramic mosaic to form a web tile panel having a 0.072" thick web contiguous with the surface of the panel. After curing at 90° C., the resultant web tile was bent around a 2.75" radius without cracking. Using the test of Example 2, it deflected 1/32" under a 1000 gram load.

A 12" x 12" panel made in accordance with this example was doped with pure neat Portland cement and pressed into a conventional Portland cement setting bed. After 7 days of damp cure, the panel was noted to be firmly bonded.

*Example 5*

Web tile specimens were prepared using the tile arrays and procedure of Example 1, but utilized as the web material was a X–5151 black chemosol plastisol which was cured at 390° F. The resulting web tile panels had a web thickness of 0.120". The panels were rollable around a 1" radius cylinder. They were very flexible, deflecting 1.25" when loaded with 1000 grams as described in Example 2.

One of the web tile panels was buttered on the back with a latex-Portland cement mortar sold under the trade name Laticrete and installed on a Portland cement slab. After cure at room temperature for one week, it was noted that the surface was impermeable to water and easily cleaned. Tile were dislodged only when pried with hammer and chisel. Another one of the web tile panels of this example was set by means of a rubber-type floor adhesive to a plywood base. A strong, firm bond of tile to wood was noted after a one week interval.

*Example 6*

Web tile specimens were prepared utilizing the tile arrays and procedure of Example 1. The web material used was a general purpose polyester of low viscosity marketed under the trade name Vibrin 117, one-half percent (0.5%) by weight M.E.K. peroxide and 0.2% by weight cobalt naphtanate were used as activator and accelerator, respectively, and the web was cured at +90° C.

*Example 7*

One hundred weight parts of the resin combination of Example 1 were mixed with 25 weight parts of a modified polyamide marketed under the trade name Epicure 890, and web tile panels were made with the resulting composition utilizing the tile arrays and procedure described in Example 1. After partially filling the joints in one panel to 0.088" and the joints in a second panel to 0.135" as in Example 1, the composition was cured in an oven at 90° C. The web tile panels so formed were rollable enough to easily wrap around a 1¾" radius. A deflection of 1¼" under a 225 gram load was recorded when flexibility was measured in accordance with the procedure of Example 2.

*Example 8*

One hundred weight parts of the resin mixture described in Example 1 above were mixed with 100 weight parts of the Epoxy Resin R described in Example 2. This combination of resins was admixed with 20 weight parts of an aliphatic polyamine sold commercially under the trade name Epicure 87. With the resulting adhesive composition, web tile panels were prepared utilizing the tile arrays and procedure of Example 1. The panels were cured in an oven at +90° C. and had the configuration shown generally in FIGURES 6 and 7.

*Example 9*

Web tile specimens were prepared utilizing the tile arrays and procedure of Example 1, but utilizing as the web material a high heat resistant, clear, liquid triallyl cyanurate polyester.

The web was cured at +90° C. to yield web tile panels having the general configuration shown in FIGURES 6–7.

*Example 10*

Fifty weight parts of a flexible epoxy resin purchased under the trade name DER–736 which has an equivalent weight of 175–205 and a viscosity of 30–60 centipoises at 25° C. was mixed with 50 weight parts of a conventional epoxide resin having an equivalent weight of 185–195, and a viscosity of 100–160 poises at 25° C.

This combination was cured using 40 weight parts of the polyamido amine described in Example 3 above.

Using the tile arrays and procedures of Example 1, web tile panels were made having the characteristics described below:

| Web Thickness, in. | Deflection (275 gm. load), in. | Radius, in. |
|---|---|---|
| 0.065 | 1¼ | 1⅛ |
| 0.080 | 15/32 | 1⅛ |
| 0.106 | 11/32 | 3 9/16 |

In the table, deflection was measured in accordance with the procedure of Example 2, and radius of bend was measured in accordance with the procedure of Example 1.

*Example 11*

One hundred grams of the resin combination from Example 1 was cured with an extremely reactive polyamine curing agent purchased under the name Epicure 874.

Using the title arrays and procedures of Example 1, web tile panels were made having the characteristics described below following curing in an oven at 90° C.:

| Web Thickness, in. | Deflection (275 gm. load), in. | Radius, in. |
|---|---|---|
| 0.078 | 1¼ | <2¾ |
| 0.092 | 1¼ | <2¾ |
| 0.115 | 31/32 | <2¾ |

It will be clear from the foregoing examples that following the teachings contained herein, web tile panels may be made having a radius of bend of less than 4 inches or between about 1 and 4 inches.

*Example 12*

The resin composition of Example 3 was mixed with 10 weight parts of an aliphatic amine curing agent purchased under the trade name "Epicure 87" to form an adhesive bonding composition. Using the procedure of Example 1, the adhesive was injected between the joints of a spaced array of 1" ceramic mosaics (9 pieces). After curing at 80° C., the resulting panel was found to have a web thickness of from about .010" to .060". The panel, although highly flexible, readily retained its integral structure.

When the web is made from organic resins of the type described, it serves as an impermeable membrane which possess water and reagent resistance as well as plastic and elastomeric properties. Thus, thin, flexible to rigid light in weight sheets and panels may be made. The upper surfaces of the ceramic tiles serve as the wearing surface giving hardness, abrasion resistance durability and permanence in color and texture. A principal feature of the products is the fact that the under surface of the tiles is provided with a network of open, interconnecting channels. Thus, when set on a mortar bed, the mortar flows into the channels thereby insuring a firm bond, and also serving to support the web.

The tiles used to make the products disclosed herein may be vitreous, non-vitreous, semi-vitreous, or impervious opaque, transparent or translucent ceramic tile.

Embodiments of the products made by following the teachings herein can be stored in rolls or flat, and may be installed directly like rugs to floor or like wall paper. In all these embodiments, the load bearing or wearing surface is a hard ceramic.

The invention in its broader aspects is not limited to the specific articles and methods described, but departures may be made therefrom within the scope of the accompanying claims without departing from the principles of the invention and without sacrificing its chief advantages.

What is claimed:

1. A unitary, flexible, prefabricated multiple unit ceramic tile mosiac consisting of a plurality of individual ceramic pieces, each of said pieces having front and back major faces and edge surfaces, each of said major faces being substantially planar and said major faces being substantially parallel to and spaced from each other, said edge surfaces extending between and generally normal to said front and back major faces, said pieces being arranged with all of their corresponding major faces lying in at least substantially the same plane and with their edge surfaces in selected laterally spaced relationship, and grouting and spacing means for said tile pieces consisting of a thin web of set-up bonding material, said web being contiguous with the front major faces of the tile pieces, said web extending into the spacing between the tile pieces from the front major faces towards the back major faces a distance which is less than the distance between said faces so as to provide an interconnecting network of open channels between the web and the back major faces of the tile pieces, said channels extending between the vertical edge surfaces of adjacent tile pieces from the back major faces of the tile pieces to the web, the web having a cross-section which is thinnest at a point spaced between adjacent edge surfaces of two tile pieces, compared to the cross-section of the web at an edge surface of at least one of said adjacent tile pieces, the cross-section of the web at the aforesaid point ranging in width up to approximately ½ of the thickness of the tile pieces, the front and back major faces of the tile pieces being completely exposed and free of the web, said web bridging the lateral spacing between the tile pieces and being tenaciously bonded to adjacent edge surfaces of the tile pieces, thereby connecting the tile pieces together solely at their edges, said panel consisting substantially completely of ceramic tile and being capable of withstanding the forces normally encountered in shipping, handling and setting ceramic tile.

2. The prefabricated, multiple unit ceramic tile mosaic of claim 1 wherein the web exposed at the front surfaces of said panel constitutes less than about 25 percent of the area of said front surface, said web comprising a flexible organic resinous material, and wherein said ceramic tile pieces have a square area of less than 54 square inches and a thickness of less than ¾".

3. The prefabricated, multiple unit ceramic tile mosaic of claim 1 wherein the web exposed at the front surface of said panel constitutes less than about 12 percent of the area of said front surface, said web comprising a flexible organic resinous material, and wherein said ceramic tile pieces have a surface area of less than 17 square inches and a thickness of between ¼" and ⅜".

4. The prefabricated, multiple unit ceramic tile mosaic of claim 1 wherein an exposed joint of said web is bonded to the edges of those tile pieces not surrounded by other tile pieces and serves as a finishing edge for the panel.

5. The prefabricated, multiple unit ceramic tile mosaic of claim 1 wherein said web in a first direction has approximately the same thickness as the distance between the front and back faces of the tile pieces, and in a second direction normal to said first direction has a thickness substantially less than the distance between the front and back spaces of the tile, such that the mosaic is completely rigid along said first direction and completely flexible along said second direction.

6. The panel of claim 1 wherein the web comprises an epoxy resin having at least two terminal epoxy

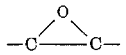

groups.

7. The panel of claim 1 wherein the web comprises a polycondensation product formed by reacting a polyhydric alcohol with a polycarboxylic acid.

8. The panel of claim 1 wherein the web comprises a member selected from the group consisting of an addition polymerization product of vinyl chloride monomer, and co-polymer of vinyl chloride with vinyl esters.

9. A roll of ceramic tile mosaic at least a portion of which having a radius of curvature of less than 4 inches, said ceramic tile mosaic consisting of a plurality of individual ceramic pieces, each of said pieces having front and back major faces and edge surfaces, each of said major faces being substantially planar and said major faces being substantially parallel to and spaced from each other, said edge surfaces extending between and generally normal to said front and back major faces, said pieces being arranged with all of their corresponding major faces lying in at least substantially the same plane and with their edge surfaces in selected laterally spaced relationship, and grouting and spacing means for said tile pieces consisting of a thin web of set-up bonding material, said web being contiguous with the front major faces of the tile pieces but slightly depressed below the front major faces so as to leave said faces substantially completely exposed, said web extending into the spacing between the tile pieces from the front major faces towards the back major faces a distance which is less than the distance between said faces so as to provide an interconnecting network of open channels between the web and the back major faces of the tile pieces, said channels extending between the vertical edge surfaces of adjacent tile pieces from the back major faces of the tile pieces to the web, the web having a cross-section which is thinnest at a point spaced between adjacent edge surfaces of two tile pieces, compared to the cross-section of the web at an edge surface of at least one of said adjacent tile pieces, the cross-section of the web at the aforesaid point ranging in width up to approximately ½ of the thickness of the tile pieces, the front and back major faces of the tile pieces being completely exposed and free of the web, said web bridging the lateral spacing between the tile pieces and being tenaciously bonded to adjacent edge surfaces of the tile pieces, thereby connecting the tile pieces together solely at their edges, said mosaic consisting substantially completely of ceramic tile and being capable of withstanding the forces normally encountered in shipping, handling and setting ceramic tile.

10. A new and useful building unit comprising a substratum, having bonded thereto by means of a setting adhesive a flexible, prefabricated multiple unit ceramic tile mosaic, said mosaic consisting of a plurality of individual ceramic pieces, each of said pieces having front and back major faces and edge surfaces, each of said major faces being substantially planar and said major faces being substantially parallel to and spaced from each other, said edge surfaces extending between and generally normal to said front and back major faces, said pieces being arranged with all of their corresponding major faces lying in at least substantially the same plane and with their edge surfaces in selected laterally spaced relationship, and grouting and spacing means for said tile pieces consisting of a thin web of set-up bonding material, said web being contiguous with the front major faces of the tile pieces but slightly depressed below the front major faces so as to leave said faces substantially completely exposed, said web extending into the spacing between the tile pieces from the front major faces towards the back major faces a distance which is less than the distance between said faces so as to provide an interconnecting network of open channels between the web and the front and back major faces of the tile pieces, said channels extending between the vertical edge surfaces of adjacent tile pieces from the back major faces of the tile pieces to the web, the web having a cross-section which is thinnest at a point spaced between adjacent edge surfaces of two tile pieces, compared to the cross-section of the web at an edge surface of at least one of said adjacent tile pieces, the cross-section of the web at the aforesaid point ranging in width up to approximately ½ of the thickness of the tile pieces, the back major faces of the tile pieces being completely exposed and free of the web, said web bridging the lateral spacing between the tile pieces and being tenaciously bonded to adjacent edge surfaces of the tile pieces, thereby connecting the tile pieces together solely at their edges, said setting adhesive contacting the substratum and the back surface of said mosaic and extending into said network of interlocking channels.

References Cited by the Examiner

UNITED STATES PATENTS

| | | | |
|---|---|---|---|
| 1,960,979 | 5/1934 | Robinson | 52—601 X |
| 1,994,644 | 3/1935 | Harshberger | 52—388 X |
| 2,045,382 | 6/1936 | Elemendorf | 52—586 |
| 2,052,229 | 8/1936 | Hyde | 52—308 |
| 2,073,130 | 3/1937 | Wallace | 52—386 X |
| 2,627,744 | 2/1953 | Lopina | 52—384 X |
| 2,718,829 | 9/1955 | Seymour et al. | 52—390 X |
| 3,041,785 | 7/1962 | MacDonald et al. | 52—389 X |
| 3,077,059 | 2/1963 | Stout | 52—127 X |
| 3,140,566 | 7/1963 | Wagner | 52—389 X |
| 3,174,893 | 3/1965 | Church et al. | 52—315 X |
| 3,208,190 | 9/1965 | Kakos et al. | 52—389 X |
| 3,209,500 | 10/1965 | Bernett | 52—390 |
| 3,239,981 | 3/1966 | Fitzgerald | 52—392 |

FOREIGN PATENTS

| | | |
|---|---|---|
| 1,205,961 | 8/1959 | France. |

CHARLES E. O'CONNELL, *Primary Examiner.*

M. O. WARNECKE, *Assistant Examiner.*

UNITED STATES PATENT OFFICE
CERTIFICATE OF CORRECTION

Patent No. 3,319,392 May 16, 1967

John V. Fitzgerald

It is certified that error appears in the above identified patent and that said Letters Patent are hereby corrected as shown below:

In the heading to the drawings and in the heading to the printed specification, title of invention, "FLEXIBLE CERAMIC FILE UNIT", each occurrence, should read -- FLEXIBLE CERAMIC TILE UNIT --.

Signed and sealed this 5th day of August 1969.

(SEAL)
Attest:

Edward M. Fletcher, Jr.
Attesting Officer

WILLIAM E. SCHUYLER, JR.
Commissioner of Patents